Oct. 14, 1930.    S. AOKI    1,778,657
SEAL FOR VAPOR ELECTRIC DEVICES
Filed Sept. 24, 1926
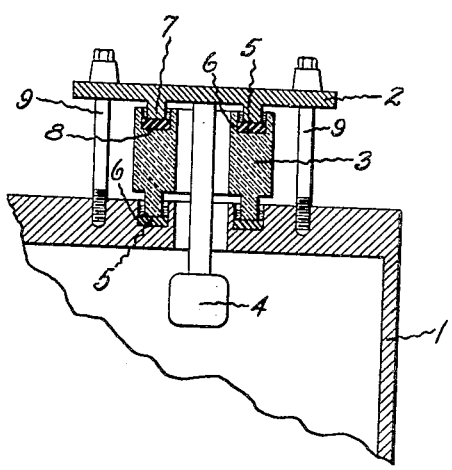
Inventor:
Sataro Aoki
by
His Attorney.

Patented Oct. 14, 1930

1,778,657

UNITED STATES PATENT OFFICE

SATARO AOKI, OF HIRATSUKA, JAPAN, ASSIGNOR TO GENERAL ELECTRIC COMPANY, A CORPORATION OF NEW YORK

SEAL FOR VAPOR ELECTRIC DEVICES

Application filed September 24, 1926, Serial No. 135,663, and in Japan October 13, 1925.

My invention relates to means for sealing together the different parts of the wall of a vapor electric device such as a mercury rectifier comprising a plurality of anodes mounted within an evacuated metal tank, and has for its principal object the provision of an impervious seal that does not deteriorate under the various operating conditions to which vapor electric devices are subjected.

Satisfactory operation of a vapor electric device, such as the mercury arc rectifier, requires that a fairly high vacuum be maintained within the rectifier tank. In order to maintain such a vacuum, it is essential that only the most reliable packing be used between the metal to metal, and the metal to insulation joints of the vessel. Though rubber gaskets compressed between the parts to be joined are quite effective for this purpose, it has been found that the sulphur content of the rubber combines with mercury vapor to form mercuric sulphide which destroys the insulating properties of the rubber and is likely to be the cause of destructive short circuits between parts of the tank charged to different voltages. For these reasons the use of rubber as the sealing means between the different parts of a mercury rectifier has heretofore necessitated frequent opening of the tank to permit reconstruction of the seals. In accordance with my invention, these difficulties are avoided by coating the surface of the rubber with a material which is not affected by oxygen and mercury, this material being applied by plating, painting, or in any other suitable manner.

My invention will be better understood from the following description when considered in connection with the accompanying drawing and its scope will be pointed out in the appended claims.

The drawing illustrates a part of a mercury rectifier wherein my invention has been embodied.

This rectifier comprises wall portions 1 and 2 which are electrically insulated from one another by means of an insulation member 3, and an anode 4 which is supported by the wall portion 2. Rubber packing 5 is interposed between the lower edge of the insulation member 3 and the bottom of a groove 6 formed in the upper surface of the wall portion 1 and a like packing is interposed between an annular rib 7 formed on the lower surface of the wall portion 2 and the bottom of a groove 8 formed in the upper edge of the insulation member 3. Bolts 9 are provided for clamping the gaskets 5 between the upper edge of the insulation member 3 and the wall portion 2 and between the lower edge of this member and the wall portion 1. The grooves 6 and 8 may be filled with mercury.

The coating applied to the gaskets 6 and 8 may consist of any suitable metal which does not destroy the resilience of the rubber and is not attacked by mercury or may consist of graphite or the like painted on the surface of the rubber.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:

1. A mercury rectifier seal structure comprising a plurality of wall sections, and a seal between said wall sections comprising a rubber gasket coated with a material not affected by mercury.

2. A mercury rectifier seal structure comprising a plurality of wall sections, and a seal between said wall sections comprising a rubber gasket coated with graphite.

3. A mercury rectifier seal structure comprising a plurality of wall sections, and a seal between said wall sections comprising a rubber gasket coated with graphite and submerged in mercury.

In witness whereof, I have hereunto set my hand this 23d day of August, 1926.

SATARO AOKI.